United States Patent
Zhao et al.

(10) Patent No.: US 8,406,113 B2
(45) Date of Patent: Mar. 26, 2013

(54) PEAK-TO-AVERAGE REDUCTION OF SC-FDMA SIGNALS WITH FREQUENCY MASK

(75) Inventors: Chunming Zhao, Chandler, AZ (US); Ning Chen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 384 days.

(21) Appl. No.: 12/253,635

(22) Filed: Oct. 17, 2008

(65) Prior Publication Data

US 2010/0097923 A1    Apr. 22, 2010

(51) Int. Cl.
 *H04J 5/04* (2006.01)
(52) U.S. Cl. ........ 370/204; 370/201; 370/208; 375/295; 375/254; 375/278; 375/296; 375/297
(58) Field of Classification Search .......... 370/202, 370/203, 204, 205, 206, 207, 208, 210, 215; 375/254, 260, 261, 278, 295, 296, 297
See application file for complete search history.

(56) References Cited

U.S. PATENT DOCUMENTS

| | | | |
|---|---|---|---|
| 2004/0165524 A1* | 8/2004 | Chen et al. | 370/208 |
| 2007/0004465 A1* | 1/2007 | Papasakellariou et al. | 455/571 |
| 2007/0188218 A1 | 8/2007 | Ueda | |
| 2008/0043877 A1* | 2/2008 | Chen et al. | 375/295 |
| 2010/0091919 A1* | 4/2010 | Xu et al. | 375/346 |

FOREIGN PATENT DOCUMENTS

WO    WO 2007/130011 A1    11/2007

OTHER PUBLICATIONS

3GPP TS 36.101, 3rd Generation Partnership Project; Technical Specification Group Radio Access Network; Evolved Universal Terrestrial Radio Access (E-UTRA); User Equipment (UE) radio transmission and reception (Release 8), v8.1.0, Mar. 2008.
J. Armstrong, Peak-to-Average Power Reduction for OFDM by Repeated Clipping and Frequency Domain Filtering, Electronics Letters, vol. 38, No. 5, Feb. 28, 2002.

* cited by examiner

*Primary Examiner* — Dady Chery
(74) *Attorney, Agent, or Firm* — Hamilton & Terrile, LLP; Michael Rocco Cannatti (57) ABSTRACT

A wireless transmitter exhibits improved power de-rating reduction, which improves the power efficiency of non-constant envelop communication systems by mapping N first samples of a first discrete Fourier transform (DFT) of a group of coded symbols to M sub-carriers according to a first sub-carrier mapping rule (212), performing a first inverse DFT (IDFT) on the M sub-carriers to provide M second samples (214), clipping the M second samples according to a clipping rule to provide M third samples (216), performing a second DFT on the M third samples (218), and applying a frequency domain mask to generate M clipped samples (220) which may be mapped to O subcarriers according to a predetermined second subcarrier mapping rule. The transmitter may be advantageously implemented within a single carrier transmission scheme, such as a single carrier-frequency division multiple access (SC-FDMA) uplink transmission scheme.

22 Claims, 5 Drawing Sheets

PEAK-TO-AVERAGE REDUCTION OF SC-FDMA SIGNALS WITH FREQUENCY MASK

BACKGROUND OF THE INVENTION

1. Field of the Invention

The present invention is directed in general to field of information processing. In one aspect, the present invention relates to a power de-rating reduction system and method in a transmitter.

2. Description of the Related Art

In general, coded orthogonal frequency division multiplexing (COFDM) systems support high data rate wireless transmissions using orthogonal channels, which offer immunity against fading and inter-symbol interference (ISI) without requiring implementation of elaborate equalization techniques. Typical COFDM systems split data into N streams, which are independently modulated on parallel spaced sub-carrier frequencies or tones. The frequency separation between sub-carriers is 1/T, where T is the COFDM symbol time duration. Each symbol may include a guard interval (or cyclic prefix) to maintain the orthogonality of the symbols. In general, COFDM systems have used inverse discrete Fourier transforms (IDFT) to generate a sampled (or discrete) composite time-domain signal, but such COFDM systems can exhibit relatively large peak-to-average power ratio (PAR) where there is constructive addition of signals from different sub-carriers. Large PARs and/or large cubic metrics (CM) are undesirable because they require a large dynamic range for a digital-to-analog (D/A) converter on the transmitter backend, and this in turn means that the D/A converter is inefficient since most sub-carrier amplitudes use a fraction of the range of the D/A converter.

In a typical transmitter backend, the output of the D/A converter is filtered before being applied to a power amplifier. Since power amplifiers tend to be non-linear, in-band distortion and spectral spreading (or spectral regrowth) may result from passing a band-limited time-varying (non-constant) envelope signal through the non-linear amplifier circuit. One technique for addressing non-linearity of a power amplifier is to operate the power amplifier at a relatively large output power backoff (OBO) or power de-rating, but this technique reduces the power efficiency of the amplifier. For example, at a 6 dB OBO, a power amplifier may exhibit a fifty percent (or more) loss in efficiency. To reduce the PAR and/or CM of COFDM systems, various designers have also implemented or proposed hard limiting (or clipping) directly on the signal to be transmitted. Unfortunately, directly clipping the signal to be transmitted may cause undesirable spectral regrowth and inter-user interference (or inter-carrier interference (ICI)) in systems that use a multiple access mode.

In certain wireless systems (such as the evolved-universal terrestrial radio access (E-UTRA) air interface), discrete Fourier transform-spread orthogonal frequency division multi-plexing (DFT-SOFDM) has been proposed as a modulation technique for uplink transmissions. Single carrier transmission schemes, such as DFT-SOFDM, generally facilitate further power de-rating reduction through the use of specific modulation or coding schemes, clipping and/or spectral filtering of a signal to be transmitted. Moreover, the PAR and CM of a basic DFT-SOFDM or single carrier-frequency division multiple access (SC-FDMA) system is generally reduced, as compared to the PAR and CM of a basic COFDM system. To further reduce the PAR and CM of basic DFT-SOFDM transmitters, it has been proposed to pre-process an input signal prior to performing a fast Fourier transform (FFT) on a group of symbols associated with the input signal. Following this approach, selected input symbols and/or bits may be attenuated in order to reduce the PAR and CM at the output of an inverse fast Fourier transform (IFFT) of the DFT-SOFDM system.

Figure 1:
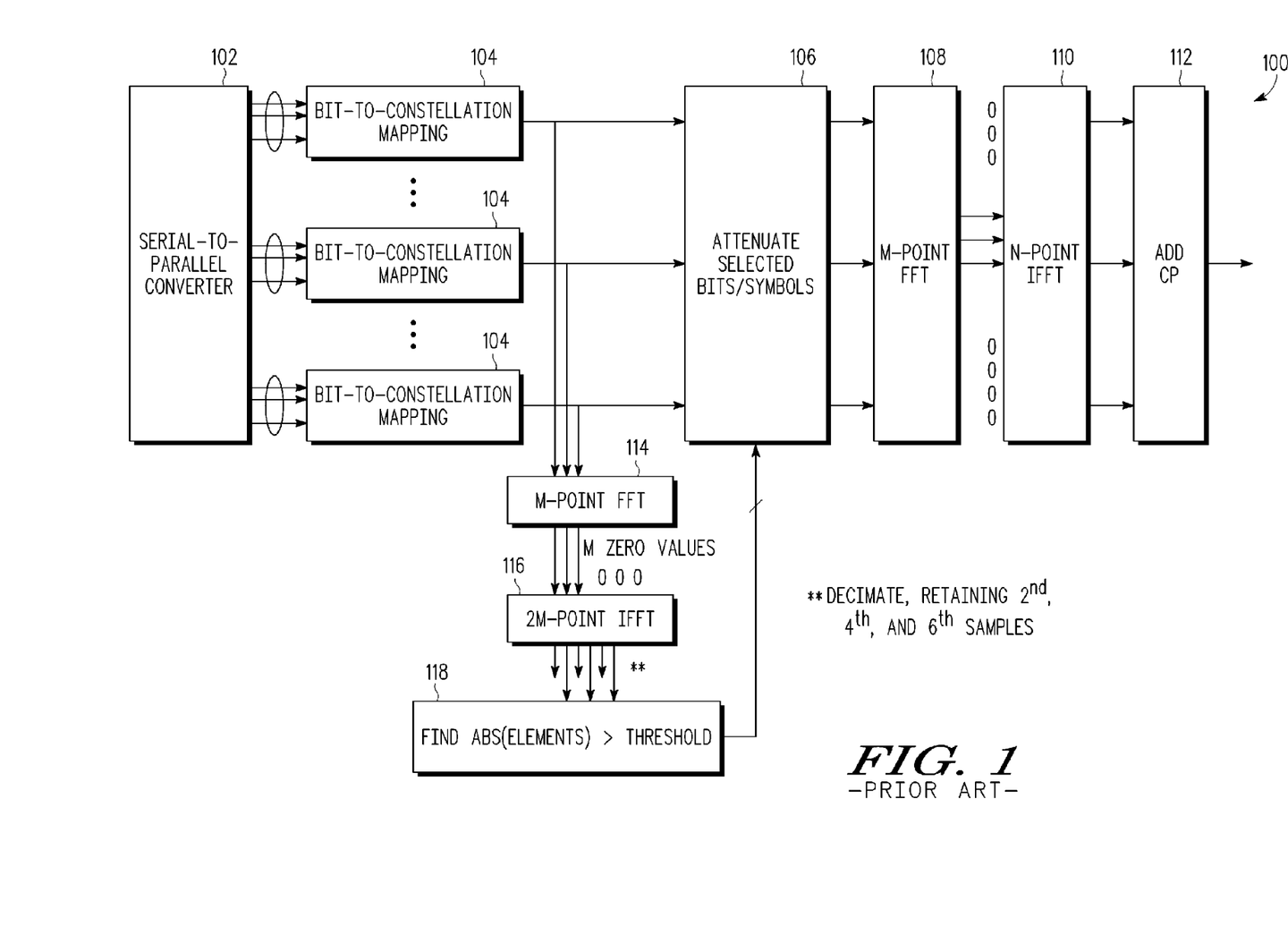
FIG. 1 is a schematic block diagram depiction of a prior art system that implements power de-rating reduction by pre-processing an input signal provided to inputs of an M-point fast Fourier transform (FFT) of a single carrier-frequency division multiple access (SC-FDMA) transmitter.

FIG. 1 depicts a relevant portion of a prior art SC-FDMA system 100 that implements a quadrature phase shift keying (QPSK) modulation scheme. As shown, data bits from a serial-to-parallel converter 102 is applied to a plurality of bit-to-constellation mapping blocks 104 which map the data bits into IQ bits or symbols. In the SC-FDMA system 100, outputs of the mapping blocks 104 are provided as inputs to an M-point fast Fourier transform (FFT) block 114 and as inputs to an attenuator block 106. Outputs of the M-point FFT 114 and M additional zero values are also provided as inputs to a 2M-point inverse FFT (IFFT) block 116. Selected outputs of the 2M-point IFFT block 116 are provided to a peak detector 118 which finds a peak value that exceeds a defined threshold, and uses the peak value to control the attenuator block 106, which attenuates selected bits (or symbols) a desired amount according to signals provided at the control inputs of the attenuator block 106. Outputs from the attenuator block 106 are provided to a conventional SC-FDMA transmitter, such as the M-point FFT block 108, an N-point IFFT block 110 and a cyclic prefix (CP) block 112 which adds a desired guard band to each symbol group. It should be noted that the sub-carrier mapping block that maps the samples of the M-point FFT to N sub-carriers in a localized manner as shown here.

While the SC-FDMA system 100 exhibits improved power de-rating reduction over conventional SC-FDMA systems, there is a need for additional power de-rating reduction for a transmitter (e.g., an uplink transmitter) that further reduces inter-carrier interference and spectral regrowth and improves the transmit power efficiency, particularly with mobile user equipment devices. In addition, there is a need for an improved system and methodology for PAR reduction that complies with the uplink for third generation partnership project long term evolution (3GPP LTE). There is also a need for an SC-FDMA transmission scheme which overcomes the problems in the art, such as outlined above. Further limitations and disadvantages of conventional solutions will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

A system and methodology are described for reducing the peak-to-average power ratio in a wireless transmitter without introducing additional in-band distortion by providing a transmission structure between the discrete Fourier transform (DFT) block and the sub-carrier mapping block of an SC-FDMA transmitter, where the transmitter structure includes a predetermined in-band frequency-domain mask that is designed to shape the frequency domain signal by providing a lowpass or bandpass spectral filter with a frequency cutoff which has a graduated step-down function so that to prevent a hard cutoff from being applied to the shape the frequency domain signal. In selected embodiments, the predetermined in-band frequency-domain mask is designed to match the output spectrum requirements specified by the 3GPP LTE standard for user equipment (UE) transmitters so that the channel bandwidth is conveyed without additional in-band distortion and the other users bandwidth is controlled to a satisfactory level while achieving better time-domain clipping performance. In operation, the transmitter structure maps N first samples of a first discrete Fourier transform (DFT) of a group of coded symbols to M sub-carriers according to a first sub-carrier mapping rule (where M is greater than N), performs a first inverse DFT (IDFT) on the M sub-carriers to provide M second samples, clips the M second samples according to a clipping rule to provide M third samples, performs a second DFT on the M third samples, and applies a predetermined in-band frequency-domain mask to shape the frequency domain signal without a hard cutoff before providing the filtered result to the sub-carrier mapping block. The transmitter structure may be advantageously implemented within a single carrier transmission scheme, such as systems that implement a single carrier-frequency division multiple access (SC-FDMA) uplink transmission scheme, which has been proposed as the uplink for third generation partnership project long term evolution (3GPP LTE).

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
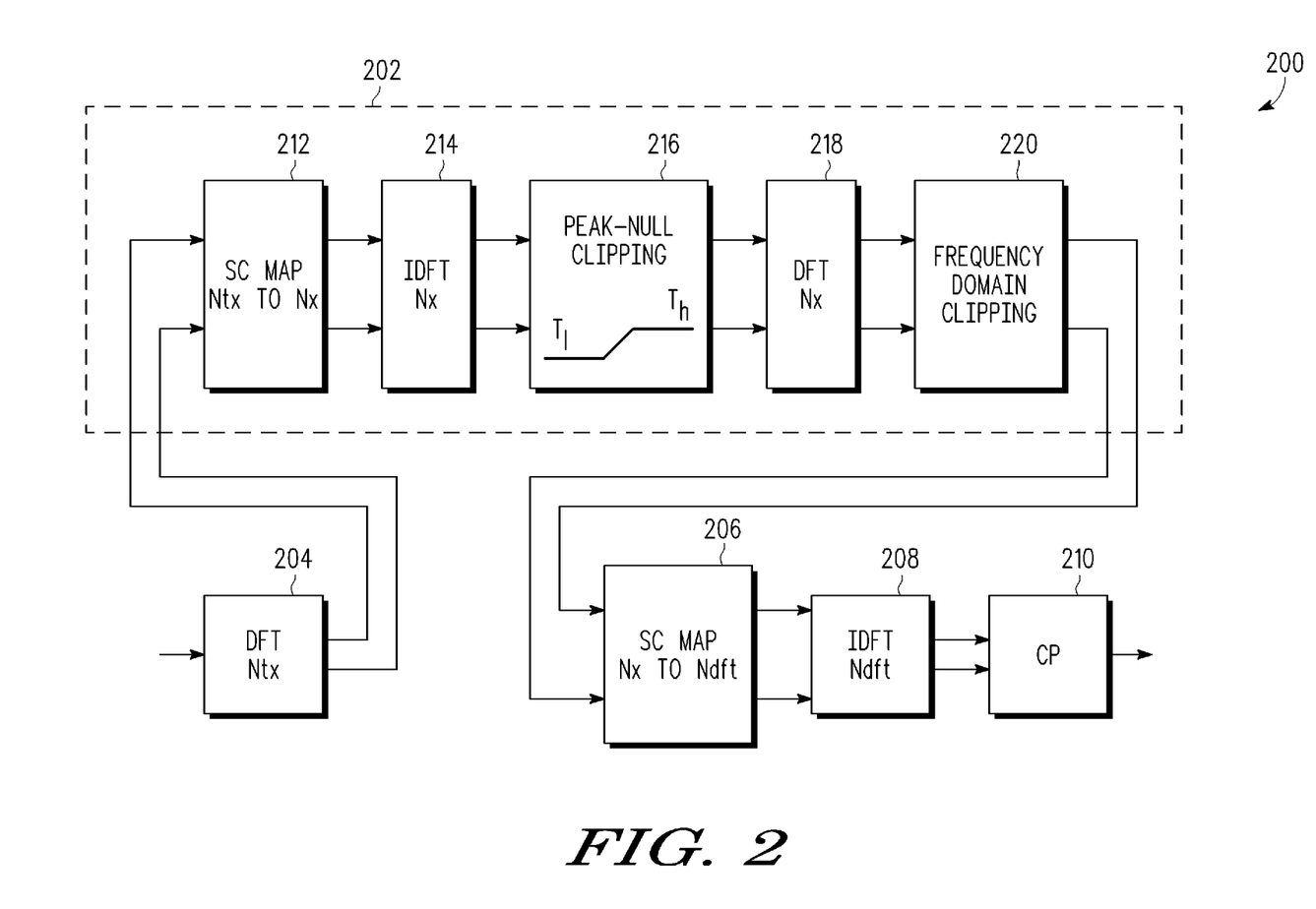
FIG. 2 is a schematic block diagram depiction of a transmitter system which implements power de-rating reduction for a single carrier transmitter in accordance with selected embodiments of the present invention.

Referring now to FIG. 2, there is depicted a schematic block diagram of an SC-FDMA transmitter system 200 which implements power de-rating reduction with a transmission structure 202 configured and/or arranged in accordance with selected embodiments of the present invention. As will be appreciated, the depicted system 200 may be implemented in whole or in part with software, hardware or a combination of hardware and software. However implemented, the SC-FDMA transmitter system 200 includes a transmission structure 202 that is located between a discrete Fourier transform (DFT) block 204 and a sub-carrier (SC) map block 206 which in turn is connected to an inverse discrete Fourier transform (IDFT) block 208 and a cyclic prefix (CP) block 210. The depicted transmission structure 202 includes an SC map block 212, an IDFT block 214, a peak-null clipping block 216, a DFT block 218 and a frequency domain clipping block 220. With the SC-FDMA transmitter system 200, the DFT block 204 is used to calculate the FFT of a group of symbols, though it will be appreciated that the FFTs employed are not limited to DFTs. In a system implementing a QPSK modulation scheme, twenty-four bits may be mapped to twelve symbols. In this case, the DFT block 204 performs a DFT on a group of twelve symbols to provide Ntx=12 samples. Ntx may correspond to, for example, integer multiples of twelve in a 3GPP LTE uplink.

The SC map block 212 maps the Ntx samples onto Nx sub-carriers (SCs), according to a predetermined mapping rule. For example, the Ntx samples may be mapped onto one-hundred fifty sub-carriers. The IDFT block 214 then provides an Nx-point IDFT, or Nx-point discrete time-domain samples, for each symbol group. The peak-null clipper 216 then clips the peak and the null of non-threshold compliant ones of the Nx-point IDFTs, according to a predetermined rule. For example, the peak may be limited to a first desired value when a magnitude of the peak exceeds a high threshold ($T_{high}$) and the null may be limited to a second desired value when a magnitude of the null is below a low threshold ($T_{low}$). The thresholds $T_{high}$ and $T_{low}$ may be set, for example, based on an error vector magnitude (EVM) requirement. Assuming that neither the peak nor null thresholds are exceeded, the sample would typically remain unchanged. Alternatively, either a peak or null of a sample alone may be modified to effect a change in peak-to-average power ratio (PAR) and/or cubic metric (CM). The DFT block 218 then provides an Nx-point DFT, e.g., an Nx-point FFT, of the clipped samples.

The frequency domain clipping block 220 then applies an in-band frequency mask to shape the frequency spectrum to achieve an additional dB of PAR reduction without introducing additional in-band distortion. In selected embodiments, the frequency mask is designed to provide frequency clipping using a step-down frequency filter function that corresponds to the minimum requirements for in-band emissions specified by the 3GPP LTE Technical Specification for User Equipment (UE) Radio Transmission and Reception. In the LTE standard, the in-band emission is defined at section 6.5.2.3 as the average across twelve sub-carriers and as a function of the resource block offset from the edge of the allocated uplink transmission bandwidth, and the minimum requirements for the in-band emissions are specified in terms of an upper limit on the relative in-band emissions.

Figure 4:
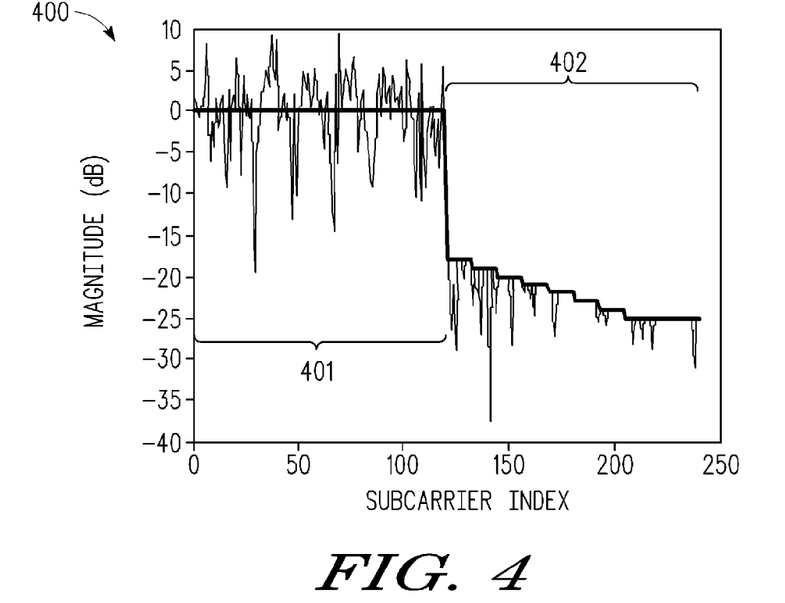
FIG. 4 is a graphical depiction of the in-band emission mask or filter that is applied to shape the frequency domain signal so as to provide PAR reduction without introducing additional in-band distortion.

To provide an example of how the frequency mask in the frequency domain clipping block 220 may be designed to match the in-band emission requirements of the LTE standard, reference is made to FIG. 4 which graphically depicts an in-band emission mask filter function 400 that may be used by the frequency domain clipping block 220 to provide frequency clipping with a step-down frequency filter function that is defined with Equation 1:

$$\max[-25,(20*\log_{10}EVM)-3-10*(\Delta_{RB}-1)/N_{RB}]dBc. \quad [1]$$

See, 3GPP TS 36.101, Section 6.5.2.3.1 (V8.1.0 Mar. 2008). As will be appreciated, error vector magnitude (EVM) is determined by the modulation scheme, where EVM for quadrature phase shift keying (QPSK) is 17.5% and that for 16-quadrature amplitude modulation (16-QAM) is 12.5%. $N_{RB}$ is the number of radio blocks (RB) occupied by the current in-band user and one RB contains twelve subcarriers. $\Delta_{RB}$ is the frequency offset, in terms of number of RB, between other users and the current in-band user. The depicted in-band emission mask filter function 400 includes a first channel bandwidth portion 401 for passing the occupied bandwidth component of the transmitter spectrum, and also includes a second bandwidth portion 402 for the bandwidth occupied by other users which passes the in-band emissions component(s) of the transmitter spectrum. To generate FIG. 4, QPSK modulation is used, which implies EVM=17.5% and $N_{RB}$=10, meaning 120 sub-carriers (portion 401) are occupied by the current in-band user. Of course, it will be appreciated that other in-band frequency masks can be implemented in the frequency domain clipping block 220, though with different PAR reduction performance. For example, the frequency domain clipping block 220 can apply an in-band emission mask filter function that is defined by the Equation 2:

$$\max[-30,-5+20*\log_{10}(EVM)-3-10*(\Delta_{RB}1)/N_{RB}] dBc, \quad [2]$$

where the unit dBc indicates that this is a relative value. While the emission mask filter function defined by Equation 2 is 5 dB lower than the emission mask filter function 400 defined by the Equation 1, the resulting clipping level is reduced in the lower mask, which results in a higher PAR.

While the implementation details may vary from one embodiment to the next, the frequency clipping mask applied by the frequency domain clipping block 220 uses a step-down frequency filter function which includes a first channel bandwidth portion and a second bandwidth portion for the bandwidth occupied by other users which passes the in-band emissions component(s) of the transmitter spectrum. Thus, instead of using a rectangular window frequency-domain filter to reshape the frequency domain signal, the frequency domain clipping block 220 applies a spectrum mask based on the LTE requirements for output spectrum emissions so that the transmitter 200 meets the output spectrum emission requirements while obtaining additional PAR reduction without introducing additional in-band distortion. Thus, at the output of the frequency domain clipping block 220, Nx frequency-clipped samples are generated having in-band emission controlled.

Following the frequency domain clipping, the SC map block 206 maps the Nx sub-carriers to Ndft sub-carriers. For example, the one-hundred fifty sub-carriers may be mapped to one-thousand twenty-four sub-carriers. It should be appreciated that the sub-carriers is mapped in a localized manner. The IDFT block 208 then provides an Ndft-point IDFT of the mapped Ndft sub-carriers. The CP block 210 then adds an appropriate CP to the Ndft-point IFFT to provide a desired guard interval for each symbol group. The resultant digital signal may then be converted to an analog signal with a D/A converter (not shown), and then amplified with a power amplifier (not shown) prior to transmission over one or more transmit antennas.

Figure 3:
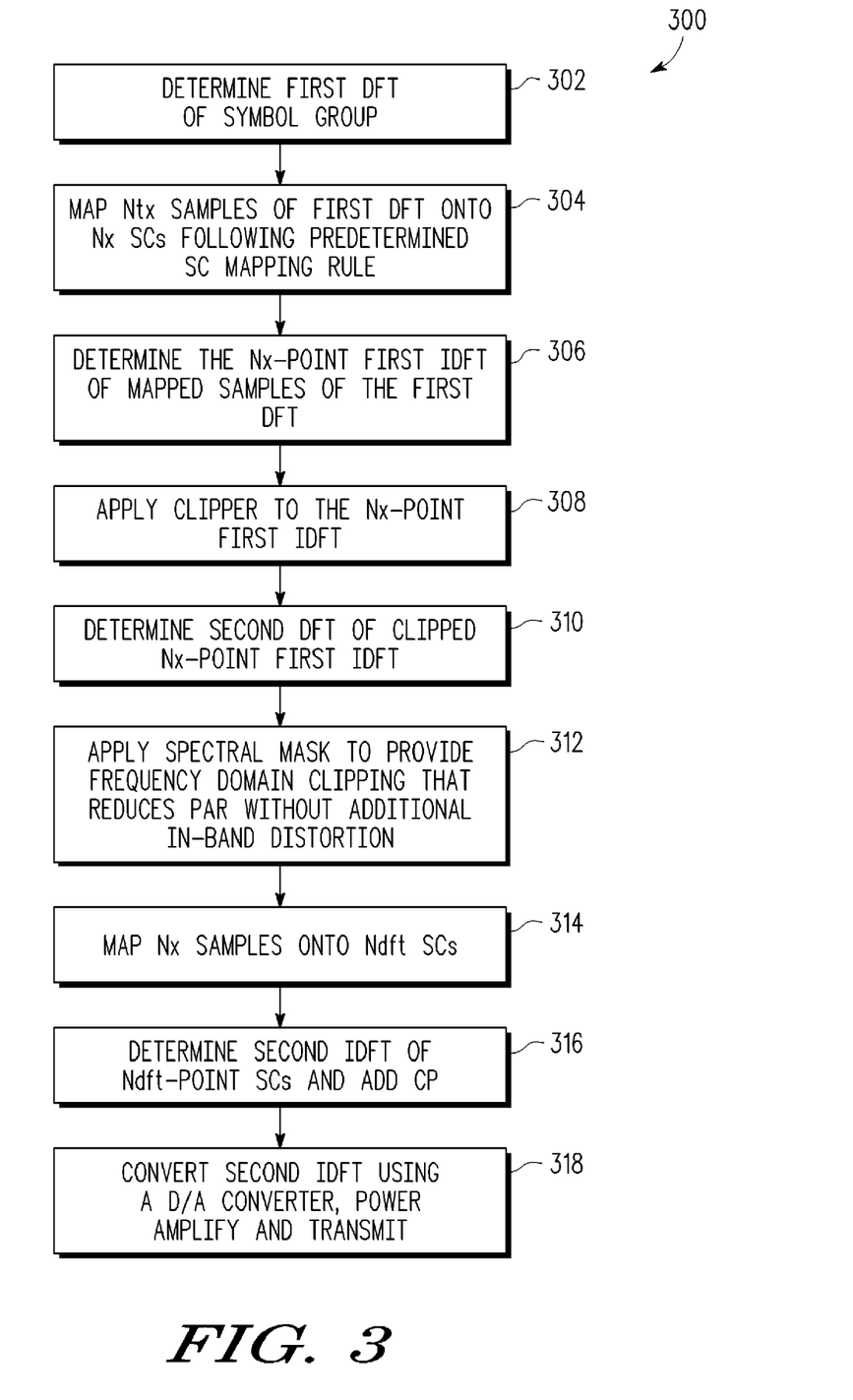
FIG. 3 is an example flow sequence for implementing power de-rating reduction in accordance with selected embodiments of the present invention.

With reference to FIG. 3, example flow sequence 300 is depicted for implementing power de-rating reduction in a transmitter, such as an uplink transmitter. As will be appreciated, the flow sequence 300 may be implemented in whole or in part with hardware (e.g., an integrated circuit) and/or with a processor (e.g., a digital signal processor) executing appropriate code. Initially, in block 302, a first DFT (i.e., a conventional DFT) of a group of symbols is determined. For example, an Ntx-point FFT of the symbol group may be calculated. Next, in block 304, the Ntx samples provided by the DFT are mapped onto Nx subcarriers following a predetermined sub-carrier (SC) mapping rule. In this case, Nx may be the size of a first IDFT. For example, Ntx may be set to seventy-two and Nx may be set to one-hundred forty-four. While other values for Ntx and Nx may be used, Nx should be greater than Ntx to provide up-sampling. In block 306, an Nx-point first IDFT of the mapped first DFT is determined. Next, in block 308, a peak-null clipper is applied to each of the Nx-points of the first IDFT. Again, either the peak, null, or both the peak and the null (or neither the peak or null in compliant samples) of a non-compliant sample may be clipped at this stage, though by clipping both the peak and null, the PAR and CM will generally be reduced. In selected embodiments, the upper or higher threshold ($T_{high}$) and the lower threshold ($T_{low}$) of the clipper may be set according to a desired error vector magnitude (EVM) requirement.

In block 310, a second DFT of the clipped Nx-point DFT is determined. Then, in block 312, a spectral mask is applied to provide frequency domain clipping that controls the in-band emission and reduces the PAR further without increasing in-band distortion. The spectral mask uses a step-down frequency filter function which includes a first channel bandwidth portion and a second portion for the bandwidth occupied by other users which passes the in-band emissions component(s) of the transmitter spectrum. Next, in mapping block 314, the Nx samples are mapped onto Ndft sub-carriers (SCs), where Ndft is the size of a second IDFT (i.e., the conventional IDFT). In various embodiments, the value of Nx may be less than or equal to the value of Ndft. Then, in block 316 the second IDFT of the Ndft-point SCs is determined and an appropriate cyclic prefix (CP) is added for each symbol group. Finally, in block 318, the second IDFT (including the CP) is converted from a digital signal to an analog signal, and the resultant analog signal is amplified for transmission.

To provide one embodiment of a mathematical description of an exemplary process 300, the following notations are defined:

$N_{TX}$, size of FFT
$N_{FFT}$, size of IFFT
$N_X$, size of proposed FFT/IFFT
$T_{high}$, the upper threshold of the clipper
$T_{low}$, the lower threshold of the clipper
s[n], the nth OFDM symbol, $0 \leq n \leq N_{TX}-1$
S[k], the FFT of s[n], $0 \leq k \leq N_{TX}-1$
{tilde over (s)}[n], $N_X$ point IFFT of S[k], $0 \leq n \leq N_X-1$,
{bar over (s)}[n], {tilde over (s)}[n] clipped by the peak-null clipper
{bar over (S)}[k], the FFT of {bar over (s)}[n], $0 \leq k \leq N_X-1$
X[k], the frequency clipped $N_X$ subcarriers from {bar over (S)}[k]
x[n], $N_{FFT}$-point IFFT of X[k].

At an initialization step of process 300, proper upper ($T_{high}$) and lower ($T_{low}$) thresholds are set per error vector magnitude (EVM) requirement. Thereafter, the process proceeds as follows:

1. Calculate $S[k]=\text{FFT}\{s[n]\}$, $0 \leq k \leq N_{TX}-1$.
2. Map the $N_{TX}$ samples of $S[k]$ onto $N_X$ subcarriers following the predetermined SC mapping rule.
3. Calculate $\{\text{tilde over }(s)\}[n]=\text{IFFT }\{S[k]\}$, $0 \leq n \leq N_X-1$.
4. Apply the peak-null clipper on {tilde over (s)}[n] as:
{bar over (s)}[n]={$T_{high}$ exp {j .angle. {tilde over (s)}[n]} if {tilde over (s)}[n]>$T_{high}$; $T_{low}$ exp {j .angle. {tilde over (s)}[n]} if {tilde over (s)}[n ]<$T_{low}$; {tilde over (s)}[n], else.
5. Calculate {bar over (S)}[k]=FFT {{bar over (s)}[n]}, $0 \leq k \leq N_X-1$.
6. Filter the Nx samples in the frequency domain by applying an in-band emission mask having a step down function that controls the in-band emission components.
7. Map X[k] onto $N_{FFT}$ subcarriers in the localized manner.
8. Calculate $x[n]=\text{IFFT }\{X[k]\}$ and add the cyclic prefix.
9. Send x[n] through D/A converter and power amplifier before transmission.

Figure 5:
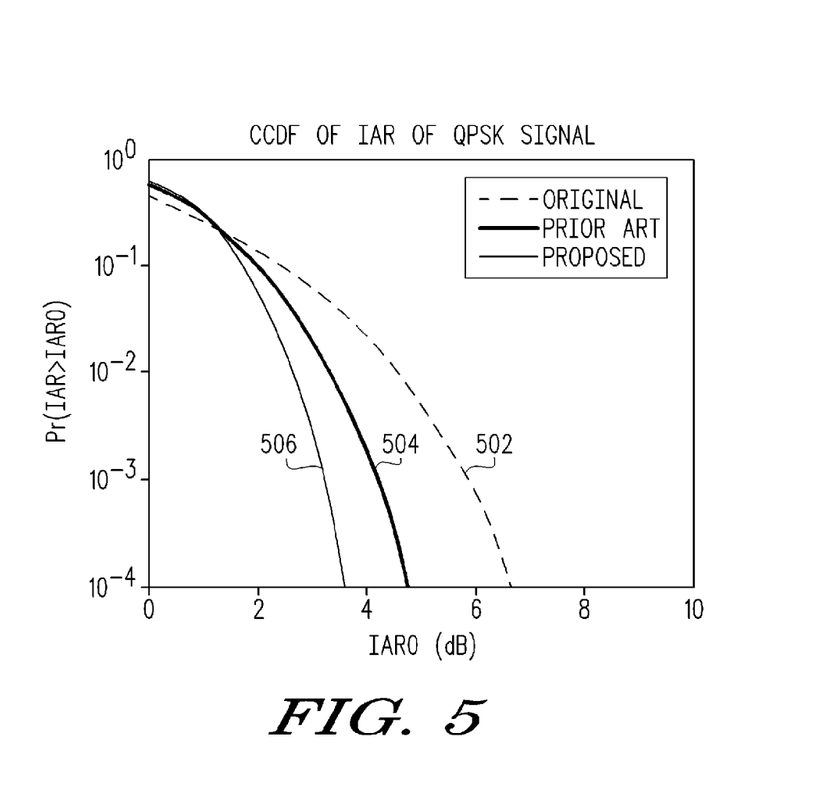
FIG. 5 is a graph including simulation curves that plot power de-rating reduction for three different SC-FDMA systems employing quadrature phase shift keying (QPSK) modulation.

To illustrate the PAR reduction provided by applying a spectral mask with a step down function, reference is now made to FIG. 5 which graphically depicts simulation curves 502, 504, 506 which plot power de-rating reduction for three different SC-FDMA systems employing quadrature phase shift keying (QPSK) modulation in terms of the probability that an instantaneous-to-average power ratio (IAR) is greater than a threshold (IAR0) versus the threshold (IAR0) for SC-FDMA systems. The simulation curves 502, 504, 506 (which respectively correspond to a conventional SC-FDMA system, the system of applying hard cutoff filter and the system of FIG. 2) have a cubic metric (CM) of 1.21 dB, 0.42 dB, and 0.18 dB, respectively. In the illustrated example, the simulation curve 506 demonstrates that an SC-FDMA system designed in accordance with an example embodiment of the present invention exhibits 0.24 dB the power de-rating reduction of the system of applying hard cutoff filter (curve 504) for QPSK modulation.

Figure 6:
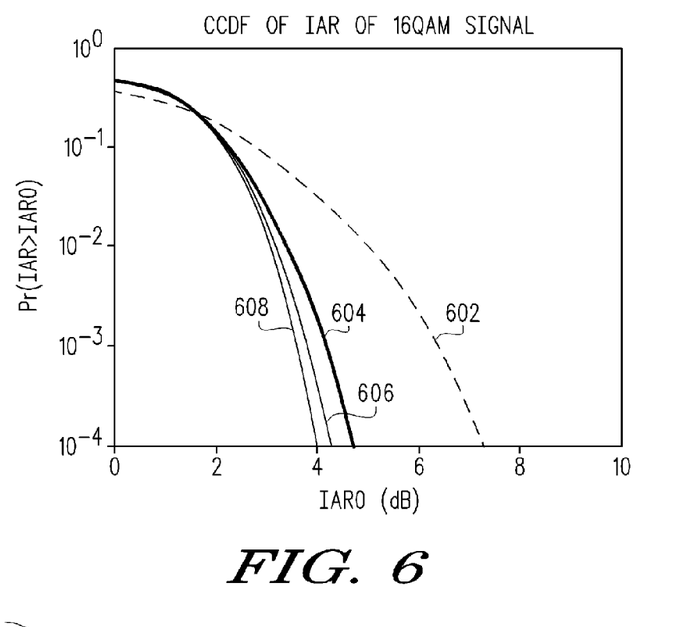
FIG. 6 is a graph including simulation curves that plot power de-rating reduction for four different SC-FDMA systems employing 16-quadrature amplitude modulation (16-QAM)

In similar fashion, FIG. 6 is a graph including simulation curves 602, 604, 606, 608 that plot power de-rating reduction for four different SC-FDMA systems employing 16-quadrature amplitude modulation (16-QAM) in terms of the probability that an instantaneous-to-average power ratio (IAR) is greater than a threshold (IAR0) versus the threshold (IAR0) for SC-FDMA systems. The simulation curves 602 and 604 correspond to a conventional SC-FDMA system and the system of applying hard cutoff filter, respectively. In addition, the simulation curve 608 corresponds to the system of FIG. 2 which is configured to implement the in-band emission mask defined with reference to Equation 1 (above), while the simulation curve 606 corresponds to the system of FIG. 2 which is configured to implement the in-band emission mask defined with reference to Equation 2 (above). The depicted simulation curves 602 and 604 have a cubic metric of 2.14 dB and 0.94 dB, respectively, while the simulation curves 606 and 608 have a cubic metric of 0.83 dB and 0.76 dB, respectively. As these simulation curves show, the SC-FDMA system designed using the spectral mask defined with reference to Equation 2 (curve 606) exhibits almost 0.11 dB the power de-rating reduction of the system of applying hard cutoff filter (curve 604) for 16-QAM modulation, while the SC-FDMA system designed using the spectral mask defined with reference to Equation 1 (curve 608) exhibits almost 0.18 dB the power de-rating reduction of the system of applying hard cutoff filter (curve 604) for 16-QAM modulation. The difference in PAR performance results from the fact that the Equation 2 spectral mask is 5 dB smaller than the Equation 1 spectral mask. The lower spectral mask has a reduced clipping level, meaning that the PAR resulting from using the Equation 2 spectral mask is higher than the PAR resulting from using the Equation 1 spectral mask. As FIG. 6 shows, different PAR reduction performance can be obtained by using different in-band emission masks.

Figure 7:
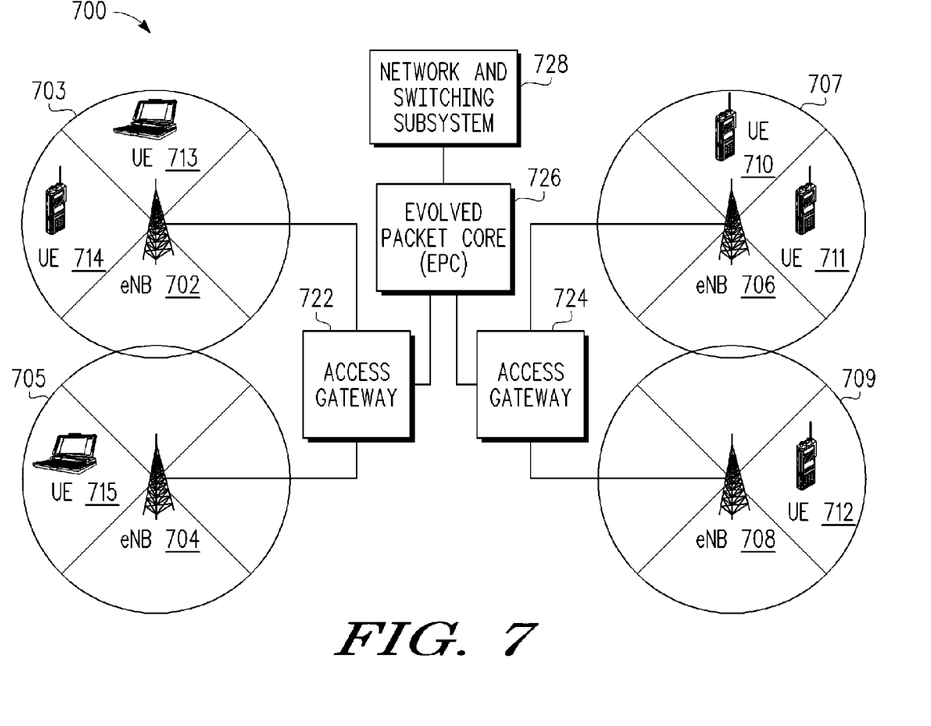
FIG. 7 schematically illustrates the architecture of an LTE wireless communication system.

To illustrate how transmitters with reduced PAR can be used, FIG. 7 is provided to schematically show the architecture of an LTE wireless communication system 700 in which base station transceiver devices 702, 704, 706, 708 and wireless end user devices 710-715 transmit wireless signals. As depicted, a plurality of wireless end user devices 710-715, such as hand-held computers, personal digital assistants (PDAs), cellular telephones, etc., may implement communication links through control transceiver devices 702, 704, 706, 708. Each transceiver device 702, 704, 706, 708 includes transmit and receive circuitry that is used to communicate directly with any mobile end user(s) 710-715 located in each transceiver device's respective cell region. Thus, transceiver device 702 includes a cell region 703 having one or more sectors in which one or more mobile end users 713, 714 are located; transceiver device 704 includes a cell region 705 having one or more sectors in which one or more mobile end users 715 are located; transceiver device 706 includes a cell region 707 having one or more sectors in which one or more mobile end users 710, 711 are located; and transceiver device 708 includes a cell region 709 having one or more sectors in which one or more mobile end users 712 are located. In the LTE architecture, the transceiver devices 702, 704, 706, 708 may be implemented with base transceiver stations (referred to as enhanced Node-B or eNB devices) which in turn are coupled to Radio Network Controllers or access gateway (AGW) devices 722, 724 which make up the UMTS radio access network (collectively referred to as the UMTS Terrestrial Radio Access Network (UTRAN)). The access gateway devices 722, 724 are connected to an EPC 726 (Evolved Packet Core) and network and switching subsystem (NSS) 728.

Though not explicitly shown, each of the wireless end user devices 710-715 includes a processor (e.g., a digital signal processor (DSP)), transceiver circuitry, and one or more input/output devices (e.g., a camera, a keypad, etc.), among other components. To implement uplink transmissions using an SC-FDMA modulation technique, the processor and/or transceiver circuitry implement serial-to-parallel conversion, N-point DFT processing, sub-carrier mapping, M-point inverse DFT processing, parallel-to-serial conversion, CP insertion, D/A conversion and power amplification. In between the N-point DFT processing and the sub-carrier mapping stages, hardware and/or software components at each end user device are used to process the uplink transmit data signal by implementing a transmitter structure which applies a frequency-domain mask having a step-down frequency filter function which includes a first channel bandwidth portion and a second bandwidth portion for the bandwidth occupied by other users which passes the in-band emissions component(s) of the transmitter spectrum. In this way, each of the wireless end user devices 710-715 communicates with a base station or eNB device 702, 704, 706, 708 with reduced PAR and no additional in-band distortion.

By now it should be appreciated that there has been provided a method and system for reducing power de-rating in a transmitter of a wireless communication device, such as an uplink transmitter that utilizes a single carrier-frequency division multiple access (SC-FDMA) transmission scheme. In the disclosed methodology, information is transmitted from a wireless device by initially performing a first DFT on the group of coded symbols to provide the N first samples. The N first samples are then mapped to M sub-carriers according to a first predetermined sub-carrier mapping rule, where M is greater than N. Thereafter, a first inverse DFT is performed on the M sub-carriers to provide M second samples. Next, the M second samples may be clipped according to a clipping rule to provide M third samples. For example, the clipping process may clip only the M second samples that are greater than a predetermined threshold, and/or may clip only the M second samples that are less than a predetermined threshold. A second discrete Fourier transform is performed on the M third samples to provide M fourth samples. Subsequently, a spectral mask is applied to the M fourth samples to generate M frequency clipped fifth samples, where the spectral mask comprises a graduated step-down function to prevent a hard cutoff from being applied to shape the M fourth samples in the frequency domain. In selected embodiments, the applied spectral mask includes a channel bandwidth portion of a transmitter spectrum for the transmitter and the transmitter spectrum occupied by one or more additional users. In other embodiments, the applied spectral mask is designed to match an in-band emission requirement for uplink transmit modulation specified for a third generation partnership project (3GPP) network. For example, the spectral mask may be defined to pass only a relative in-band emission having maximum values defined by $\max[-25, (20*\log_{10}EVM)-3-10*(\Delta_{RB}-1)/N_{RB}]$. Finally, the M frequency clipped fifth samples are mapped to O subcarriers according to a predetermined second subcarrier mapping rule (where O is greater than or equal to M), a second inverse DFT is performed on the O sub-carriers to provide O sixth samples, and a cyclic prefix is added to the sixth samples.

In another form, there is provided a communication device which includes an input device and a transmitter circuit coupled to the input device to receive samples, where the transmitter circuit may be implemented as a digital signal processor, an application specific integrated circuit, a microprocessor or a field programmable gate array device. The transmitter circuit is configured to map N first samples of a first discrete Fourier transform (DFT) of a group of coded symbols to M sub-carriers according to a first sub-carrier mapping rule, where M is greater than N, and to perform a first inverse DFT on the M sub-carriers to provide M second samples. In addition, the transmitter circuit is configured to clip the M second samples according to a clipping rule to provide M third samples, such as by clipping only the M second samples that are less than a predetermined threshold, or clipping only the M second samples that are greater than a predetermined threshold. The transmitter circuit is also configured to perform a second DFT on the M third samples to provide a M fourth samples, and then to apply a spectral mask to the M fourth samples to generate M frequency clipped fifth samples by shaping the M fourth samples in the frequency domain. In selected embodiments, the spectral mask includes a first channel bandwidth portion of a transmitter spectrum for the transmitter and a second bandwidth portion of the transmitter spectrum occupied by one or more additional users. In other embodiments, the spectral mask passes only a relative in-band emission having maximum values defined by $\max[-25, (20*\log_{10}EVM)-3-10*(\Delta_{RB}-1)/N_{RB}]$. In still further embodiments, the spectral mask is designed to match an in-band emission requirement for uplink transmit modulation specified for a third generation partnership project (3GPP) network. To implement a single carrier-frequency division multiple access (SC-FDMA) transmission scheme for uplink transmissions, the communication device may also include a baseband processor for implementing the transmitter circuit functions and for performing the first DFT on the group of coded symbols to provide the N first samples; mapping the M frequency clipped fifth samples to O subcarriers according to a predetermined second subcarrier mapping rule (where O is greater than or equal to M); performing a second IDFT on the O sub-carriers to provide O sixth samples; and adding a cyclic prefix to the sixth samples to provide a discrete time-domain signal for transmission. With the baseband processor, the transmitter circuit is configured to receive the N first samples and to generate the M frequency clipped fifth samples.

In another form, there is provided an SC-FDMA uplink transmitter which includes a first transform module (for performing a first fast Fourier transform on a group of coded symbols to provide the N first samples), a first mapping module (that maps the N first samples to M sub-carriers according to a first predetermined sub-carrier mapping rule, where M is greater than N), a first inverse transform module (that performs a first inverse fast Fourier transform on the M sub-carriers to provide M second samples), a clipping module (that clips the M second samples according to a clipping rule to provide M third samples), a second transform module (that performs a second fast Fourier transform on the M third samples to provide M fourth samples), a frequency clipping module (that applies a spectral mask to the M fourth samples to generate M frequency clipped fifth samples by shaping the M fourth samples in the frequency domain using a graduated step-down frequency filtering function), a second mapping module (that maps the M frequency clipped fifth samples to O subcarriers according to a predetermined second subcarrier mapping rule, where O is greater than or equal to M), a second inverse transform module (that performs a second inverse fast Fourier transform on the O sub-carriers to provide O sixth samples), and a cyclic prefix module (that adds a cyclic prefix to the O sixth samples to provide a discrete time-domain signal for transmission). In selected embodiments, the frequency clipping module applies a spectral mask comprising a first channel bandwidth portion of a transmitter spectrum for the transmitter and a second bandwidth portion of the transmitter spectrum occupied by one or more additional users. In other embodiments, the frequency clipping module applies a spectral mask defined to pass only a relative in-band emission having maximum values defined by $\max[-25, (20*\log_{10}EVM)-3-10*(\Delta_{RB}-1)/N_{RB}]$.

The methods and systems for reducing PAR with frequency domain clipping of uplink transmission signals as shown and described herein may be implemented using any combination of computer programming software, firmware or hardware. For software implementations, a computer-readable medium (such as fixed (hard) drives, diskettes, optical disks, magnetic tape, semiconductor memories such as ROMs, PROMs, etc.) is used to store computer programming code (whether software or firmware) as one or more objects, agents, threads, subroutines, separate software applications, two or more lines of code or other suitable software structures operating in one or more separate software applications, on one or more different processors, or other suitable software architectures. The computer programming code is executed as a computer program on a general purpose or special purpose computer to perform certain tasks, either executing the code directly from the storage device, by copying the code from the storage device into another storage device such as a hard disk, RAM, etc., or by transmitting the code for remote execution. For a hardware implementation, the elements used to perform various transmit signal processing steps at the transmitter (e.g., serial-to-parallel conversion, N-point DFT processing, sub-carrier mapping, M-point inverse DFT processing, parallel-to-serial conversion, CP insertion, D/A conversion and power amplification, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the transmit signal processing steps may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein for applying frequency domain clipping are described with reference to the processing of uplink transmissions by wireless end user devices, the present invention is not necessarily limited to the example embodiments illustrate herein. For example, various embodiments of the system and design methodology disclosed herein may be implemented in connection with transmit signal processing from an eNB or base station device to a wireless end user devices, as well as with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for power de-rating reduction in a transmitter of a wireless communication device, comprising:
   mapping N first samples of a first discrete Fourier transform (DFT) of a group of coded symbols to M sub-carriers according to a first predetermined sub-carrier mapping rule, where M is greater than N;
   performing a first inverse DFT on the M sub-carriers to provide M second samples;
   performing a second DFT on at least some of the M second samples to provide M fourth samples; and
   applying a spectral mask to the M fourth samples to generate M frequency clipped fifth samples, where the spectral mask comprises a graduated step-down function to prevent a hard cutoff from being applied to shape the M fourth samples in the frequency domain.

2. The method of claim 1, further comprising:
   clipping the M second samples according to a clipping rule to provide M third samples prior to performing the second DFT on the M third samples to provide M fourth samples.

3. The method of claim 2, where clipping the M second samples comprises clipping only the M second samples that are greater than a predetermined threshold.

4. The method of claim 2, where clipping the M second samples comprises clipping only the M second samples that are less than a predetermined threshold.

5. The method of claim 1, further comprising:
   mapping the M frequency clipped fifth samples to O sub-carriers according to a predetermined second subcarrier mapping rule, where O is greater than or equal to M.

6. The method of claim 5, further comprising:
   performing the first DFT on the group of coded symbols to provide the N first samples;
   performing a second IDFT on the O sub-carriers to provide O sixth samples; and
   adding a cyclic prefix to the O sixth samples.

7. The method of claim 1, wherein the transmitter is an uplink transmitter that utilizes a single carrier-frequency division multiple access (SC-FDMA) transmission scheme.

8. The method of claim 1, where applying a spectral mask comprises applying a spectral mask comprising a first channel bandwidth portion of a transmitter spectrum for the transmitter and a second bandwidth portion of the transmitter spectrum occupied by one or more additional users.

9. The method of claim 1, where applying a spectral mask comprises applying a spectral mask defined to pass only a relative in-band emission having maximum values defined by $\max[-25, (20*\log_{10}EVM)-3-10*(\Delta_{RB}-1)/N_{RB}]$.

10. The method of claim 1, where applying a spectral mask comprises applying a spectral mask designed to match an in-band emission requirement for uplink transmit modulation specified for a third generation partnership project (3GPP) network.

11. A communication device, comprising:
   an input device; and
   a transmitter circuit coupled to the input device to receive samples, wherein the transmitter circuit is configured to:
   map N first samples of a first discrete Fourier transform (DFT) of a group of coded symbols to M sub-carriers according to a first sub-carrier mapping rule, where M is greater than N;
   perform a first inverse DFT on the M sub-carriers to provide M second samples;
   perform a second DFT on at least some of the M second samples to provide M fourth samples; and
   apply a spectral mask to the M fourth samples which uses a step-down frequency filter function to generate M frequency clipped fifth samples by shaping the M fourth samples in the frequency domain.

12. The communication device of claim 11, where the transmitter circuit is configured to clip the M second samples according to a clipping rule to provide M third samples prior to performing the second DFT on the M third samples to provide M fourth samples.

13. The communication device of claim 11, where the transmitter circuit comprises a digital signal processor, an application specific integrated circuit, a microprocessor or a field programmable gate array device.

14. The communication device of claim 12, where the transmitter circuit is configured to clip only the M second samples that are less than a predetermined threshold.

15. The communication device of claim 12, where the transmitter circuit is configured to clip only the M second samples that are greater than a predetermined threshold.

16. The communication device of claim 11, where the transmitter circuit is configured to apply a spectral mask comprising a first channel bandwidth portion of a transmitter spectrum for the transmitter and a second bandwidth portion of the transmitter spectrum occupied by one or more additional users.

17. The communication device of claim 11, where the transmitter circuit is configured to apply a spectral mask which passes only a relative in-band emission having maximum values defined by $\max[-25, (20*\log_{10}EVM)-3-10*(\Delta_{RB}-1)/N_{RB}]$.

18. The communication device of claim 11, where the transmitter circuit is configured to apply a spectral mask designed to match an in-band emission requirement for uplink transmit modulation specified for a third generation partnership project (3GPP) network.

19. The SC-FDMA uplink transmitter of claim 18, where the frequency clipping module applies a spectral mask comprising a first channel bandwidth portion of a transmitter spectrum for the transmitter and a second bandwidth portion of the transmitter spectrum occupied by one or more additional users.

20. The SC-FDMA uplink transmitter of claim 18, where the frequency clipping module applies a spectral mask defined to pass only a relative in-band emission having maximum values defined by $\max[-25, (20*\log_{10}EVM)-3-10*(\times_{RB}-1)/N_{RB}]$.

21. The communication device of claim 11, further comprising a baseband processor for implementing a single carrier-frequency division multiple access (SC-FDMA) transmission scheme for uplink transmissions by performing the first DFT on the group of coded symbols to provide the N first samples; mapping the M frequency clipped fifth samples to O subcarriers according to a predetermined second subcarrier mapping rule, where O is greater than or equal to M; performing a second IDFT on the O sub-carriers to provide O sixth samples; and adding a cyclic prefix to the sixth samples to provide a discrete time-domain signal for transmission; where the transmitter circuit is configured to receive the N first samples and to generate the M frequency clipped fifth samples.

22. A single carrier-frequency division multiple access (SC-FDMA) uplink transmitter comprising:
a first transform module that performs a first fast Fourier transform on a group of coded symbols to provide the N first samples;
a first mapping module that maps the N first samples to M sub-carriers according to a first predetermined sub-carrier mapping rule, where M is greater than N;
a first inverse transform module that performs a first inverse fast Fourier transform on the M sub-carriers to provide M second samples;
a clipping module that clips the M second samples according to a clipping rule to provide M third samples;
a second transform module that performs a second fast Fourier transform on the M third samples to provide M fourth samples;
a frequency clipping module that applies a spectral mask to the M fourth samples to generate M frequency clipped fifth samples by shaping the M fourth samples in the frequency domain using a graduated step-down frequency filtering function;
a second mapping module that maps the M frequency clipped fifth samples to O subcarriers according to a predetermined second subcarrier mapping rule, where O is greater than or equal to M;
a second inverse transform module that performs a second inverse fast Fourier transform on the O sub-carriers to provide O sixth samples; and
a cyclic prefix module that adds a cyclic prefix to the O sixth samples to provide a discrete time-domain signal for transmission.

* * * * *

UNITED STATES PATENT AND TRADEMARK OFFICE
CERTIFICATE OF CORRECTION

PATENT NO. : 8,406,113 B2
APPLICATION NO. : 12/253635
DATED : March 26, 2013
INVENTOR(S) : Chunming Zhao and Ning Chen It is certified that error appears in the above-identified patent and that said Letters Patent is hereby corrected as shown below:

In the Claims

Column 13, line 31: Claim "19" should read Claim "21" and "of claim 18," should read "of claim 20,"

Column 13, line 36: Claim "20" should read Claim "22" and "of claim 18," should read "of claim 20,"

Column 13, line 40: "10*(×" should read "10*(Δ"

Column 13, line 41: Claim "21" should read Claim "19"

Column 14, line 12: Claim "22" should read Claim "20"

Signed and Sealed this
Twenty-eighth Day of May, 2013

Teresa Stanek Rea
*Acting Director of the United States Patent and Trademark Office*